US012703333B2

(12) United States Patent
Dowling et al.

(10) Patent No.: US 12,703,333 B2
(45) Date of Patent: Aug. 11, 2026

(54) DYNAMIC BRAKE BIASING FOR ARTICULATING VEHICLES

(71) Applicant: Caterpillar Inc., Peoria, IL (US)

(72) Inventors: Alexander E. Dowling, Mt. Hicks (AU); Shinya Sono, Naperville, IL (US); Joshua W. Dorothy, Dunlap, IL (US); Brodie L. Thompson, West Ulverstone (AU)

(73) Assignee: Caterpillar Inc., Peoria, IL (US)

(*) Notice: Subject to any disclaimer, the term of this patent is extended or adjusted under 35 U.S.C. 154(b) by 150 days.

(21) Appl. No.: 18/751,450

(22) Filed: Jun. 24, 2024

(65) Prior Publication Data

US 2025/0388198 A1 Dec. 25, 2025

(51) Int. Cl.
*B60T 8/172* (2006.01)
*B60T 8/1761* (2006.01)

(52) U.S. Cl.
CPC ............ *B60T 8/172* (2013.01); *B60T 8/1761* (2013.01); *B60T 2250/04* (2013.01)

(58) Field of Classification Search
CPC ..... B60T 8/172; B60T 8/1761; B60T 2250/04
See application file for complete search history.

(56) References Cited

U.S. PATENT DOCUMENTS 6,301,548 B1 * 10/2001 Gerum ................. B60T 8/1708 702/158
10,001,187 B2 6/2018 Burgoon et al.
10,246,087 B2 4/2019 Mitchell et al.
10,501,061 B2 12/2019 Owen et al.
10,940,843 B2 3/2021 Ganzel
11,192,536 B1 12/2021 Alexander et al.
11,247,561 B2 2/2022 Gully
RE49,258 E 10/2022 Spillane et al.
11,623,638 B2 * 4/2023 Smith .................. B60W 40/10 701/70
2002/0128764 A1 * 9/2002 Hecker ................ B60T 8/1708 701/70
2010/0145576 A1 * 6/2010 Doi ....................... B62D 61/00 701/41
2017/0282925 A1 * 10/2017 Geller ................... B60T 8/3255
2018/0265058 A1 * 9/2018 Hasegawa ............ B60T 8/1766
2020/0079373 A1 * 3/2020 Ortmann .............. B60W 10/08
2021/0078557 A1 3/2021 Kobune et al.
2025/0033698 A1 * 1/2025 Sakagami ............. B62D 11/04
2025/0206273 A1 * 6/2025 Rydström .............. B60T 8/172

FOREIGN PATENT DOCUMENTS

DE 102019122486 A1 2/2021
DE 102019128513 A1 4/2021

* cited by examiner

*Primary Examiner* — Carl C Staubach

(57) ABSTRACT

A method for dynamically controlling a vehicle having at least one wheel includes: measuring a wheel speed of the at least one wheel as a measured wheel speed; determining whether the measured wheel speed exceeds a slip value threshold; and if the measured wheel speed exceeds the slip value threshold, calculating a wheel speed control value based on a center of gravity of the vehicle and at least one of: a vehicle mass of the vehicle, a vehicle slope of the vehicle, an articulation angle of the vehicle, a vehicle speed of the vehicle, and a vehicle direction of the vehicle; and controlling a desired wheel speed of the at least one wheel based on the wheel speed control value.

20 Claims, 6 Drawing Sheets

DYNAMIC BRAKE BIASING FOR ARTICULATING VEHICLES

TECHNICAL FIELD

The present disclosure generally relates to dynamic brake biasing methods, systems, and controllers for articulating vehicles, such as trucks and loaders.

BACKGROUND

The shift to the electrification of vehicles, including construction vehicles, such as trucks and loaders used in construction and mining/underground applications, has generally resulted in the removal of conventional driveshafts for the driven wheels of those vehicles. In particular, it is more efficient from a powertrain standpoint to move electric motors closer to the final drive of the vehicle, sometimes eliminating the driveshaft. Typical examples of such arrangements include electronic axles ("E-axles") and wheel station motors. When such vehicles are unloaded, however, they typically have a very uneven weight split (e.g., from the front of the vehicle to the back of the vehicle due to the presence of heavy batteries onboard), such that without a conventional driveshaft, during deceleration events the vehicles are more prone to sliding or a loss of traction (i.e., greater wheel slippage).

U.S. Pat. No. 11,247,561 describes a system for controlling movement of a vehicle having a user input device and a computing system. The user input device dynamically controls the settings or balance of driving dynamics in a vehicle, and the user input device is configured to receive a manual input from a user. The computing system controls the settings of the vehicle driving dynamics and/or the balance of the vehicle, and the computing system is in data communication with the user input device and configured to change the driving dynamics balance proportionately to the manual input upon receiving an input command from the user input device. In an embodiment, the brakes may apply different amounts of braking forces under deceleration while cornering to trail brake and allow maximum braking forces without exceeding the limit of grip of any given wheel. This document, however, does not address vehicle articulation, or control according to changing vehicle payloads.

SUMMARY

One aspect of the present disclosure is directed to a method for dynamically controlling a vehicle having at least one wheel, the method comprising: measuring a wheel speed of the at least one wheel as a measured wheel speed; determining whether the measured wheel speed exceeds a slip value threshold; and if the measured wheel speed exceeds the slip value threshold, calculating a wheel speed control value based on a center of gravity of the vehicle and at least one of: a vehicle mass of the vehicle, a vehicle slope of the vehicle, an articulation angle of the vehicle, a vehicle speed of the vehicle, and a vehicle direction of the vehicle; and controlling a desired wheel speed of the at least one wheel based on the wheel speed control value.

Another aspect of the present disclosure is directed to a dynamic brake biasing system for a vehicle, the vehicle having a center of gravity, a vehicle mass, a vehicle slope, an articulation angle, a vehicle speed, and a vehicle direction, the system comprising: at least one wheel being at least one of stoppable by a friction brake and drivable by an electric motor; and a controller configured to: measure a wheel speed of the at least one wheel as a measured wheel speed, determine whether the measured wheel speed exceeds a slip value threshold, and if the measured wheel speed exceeds the slip value threshold, calculate a wheel speed control value based on the center of gravity and at least one of: the vehicle mass, the vehicle slope, the articulation angle, the vehicle speed, and the vehicle direction, and control a desired wheel speed of the at least one wheel based on the wheel speed control value.

A further aspect of the present disclosure is directed to a controller for a vehicle having at least one wheel, the at least one wheel being at least one of stoppable by a friction brake and drivable by an electric motor, the controller being configured to: receive a measured wheel speed of the at least one wheel; receive a vehicle mass of the vehicle, a vehicle slope of the vehicle, an articulation angle of the vehicle, a vehicle speed of the vehicle, and a vehicle direction of the vehicle; determine whether the measured wheel speed exceeds a slip value threshold; and if the measured wheel speed exceeds the slip value threshold, calculate a wheel speed control value based on a center of gravity of the vehicle and at least one of the vehicle mass, the vehicle slope, the articulation angle, the vehicle speed, and the vehicle direction; and control a desired wheel speed of the at least one wheel based on the wheel speed control value.

DETAILED DESCRIPTION

The methods, systems, and controllers of the present application overcome the problems of the prior art by controlling the front and rear friction brakes and/or electric motors of an articulated vehicle depending on one or more factors that are affected by an uneven weight split of the vehicle (e.g., when the vehicle is unloaded) and changes during operation of the vehicle, such as terrain conditions. Such factors can include, but are not limited to, a center of gravity of the vehicle, a vehicle mass of the vehicle, a vehicle slope of the vehicle, an articulation angle of the vehicle, a vehicle speed of the vehicle, and a vehicle direction of the vehicle.

Figure 1:
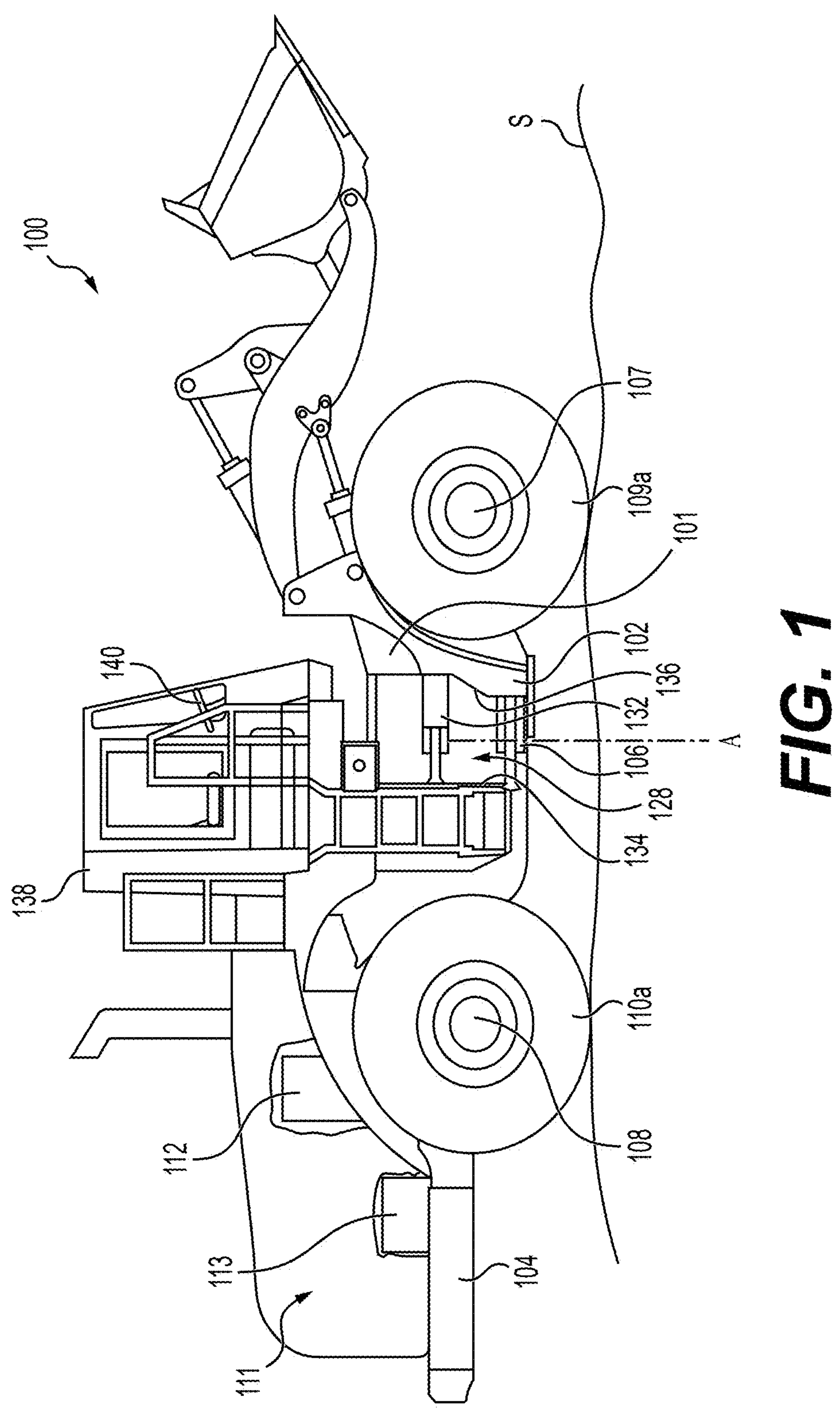
FIG. 1 shows a side view of an exemplary articulated vehicle.

FIG. 1 shows an articulated work vehicle 100. In particular, FIG. 1 illustrates an articulated wheel loader machine which may be employed in various industries, including construction, agriculture, and mining. Although embodiments of the disclosed subject matter are described in relation to an articulated wheel loader machine, embodiments of the disclosed subject matter are not so limited, and may be equally applicable to other earth-working machines, such as a hydraulic excavator, a scraper, a haul truck, a motor grader, and any other machine having an articulating arrangement. Further, while a wheeled work machine is shown and described, embodiments of the disclosed subject matter may also be implemented in other work machines, including track-type work machines. Hereinafter, the articulated work vehicle 100 has been simply referred to as vehicle 100 without any limitations. Embodiments of the disclosed subject matter can also pertain to a work vehicle that does not have an articulating arrangement, and instead has a center pivot arrangement.

In general, the vehicle 100 includes a body 101 to support the various components therein. Referring to FIGS. 1-4, the vehicle 100 can include a front frame 102 and a rear frame 104 pivotally coupled together by a hitch 106. The hitch 106 provides an articulation joint to move the front frame 102 with respect to the rear frame 104. The term "hitch" as used herein can encompass an articulation joint, and hereinafter the term "hitch 106" has been interchangeably used with the term "articulation joint 106." In particular, the hitch 106 may have spaced apart mounting portions, fixed to each of the front frame 102 and the rear frame 104, which may be affixed together (e.g., pinned together) along a generally vertical axis, represented by A in the drawings. With this configuration, the mounting portions along with the front frame 102 and the rear frame 104 may swivel about the vertical axis A, thereby allowing the vehicle 100 to steer about the vertical axis A, as described in detail below. The articulation joint 106 may also comprise an oscillating hitch.

The vehicle 100 may include a front axle assembly 107 supported on the front frame 102 and/or a rear axle assembly 108 supported on the rear frame 104. The vehicle 100 may also include a first pair of wheels 109 and a second pair of wheels 110 supported by the front axle assembly 107 and the rear axle assembly 108, respectively. FIG. 1 shows one wheel 109*a*, 110*a* of each of the first and second pairs of wheels 109, 110.

Figure 4:
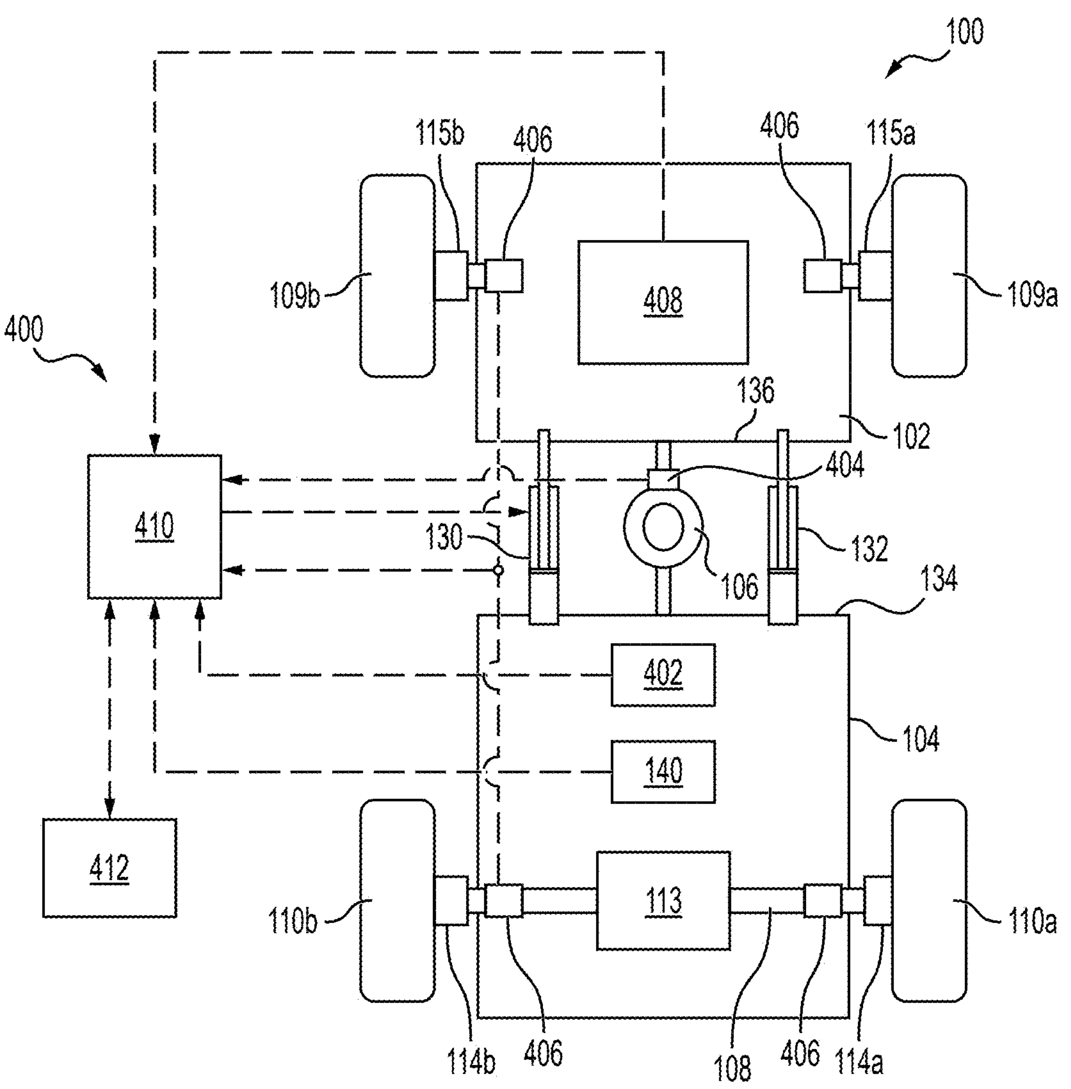
FIG. 4 shows a block diagram of the articulated vehicle of FIG. 1 with a dynamic brake biasing system according to the present disclosure.

The vehicle 100 can include one or more powertrains 111 mounted on the front frame 102 or the rear frame 104. In the example shown, the powertrain 111 is mounted on the rear frame 104. The powertrains 111, generally, may include one or more power sources 112 and potentially a transmission 113, which may provide motive power to the first pair of wheels 109 and/or the second pair of wheels 110, and thereby provide movement of the vehicle 100. A power source 112 may be, for example, a diesel engine, a gasoline engine, a natural gas engine, an electrical engine, a hybrid engine, or any other engine known in the art. A power source 112 may alternatively be a fuel cell, a power storage device such as a battery, or the like. The transmission 113 may be a mechanical transmission, a hydraulic transmission, or any other transmission type known in the art. In some examples, the transmission 113 may be operable to produce multiple output speed ratios (or a continuously variable speed ratio) between one or more power sources 112 and the driven first and second pairs of wheels 109, 110. In the illustration of FIG. 4, for example, the transmission 113 may include a rear differential coupled with the rear axle assembly 108. In some examples, the transmission 113 may further include a torque converter that can assist with transmission of torque generated by a power source 112.

Figure 2:
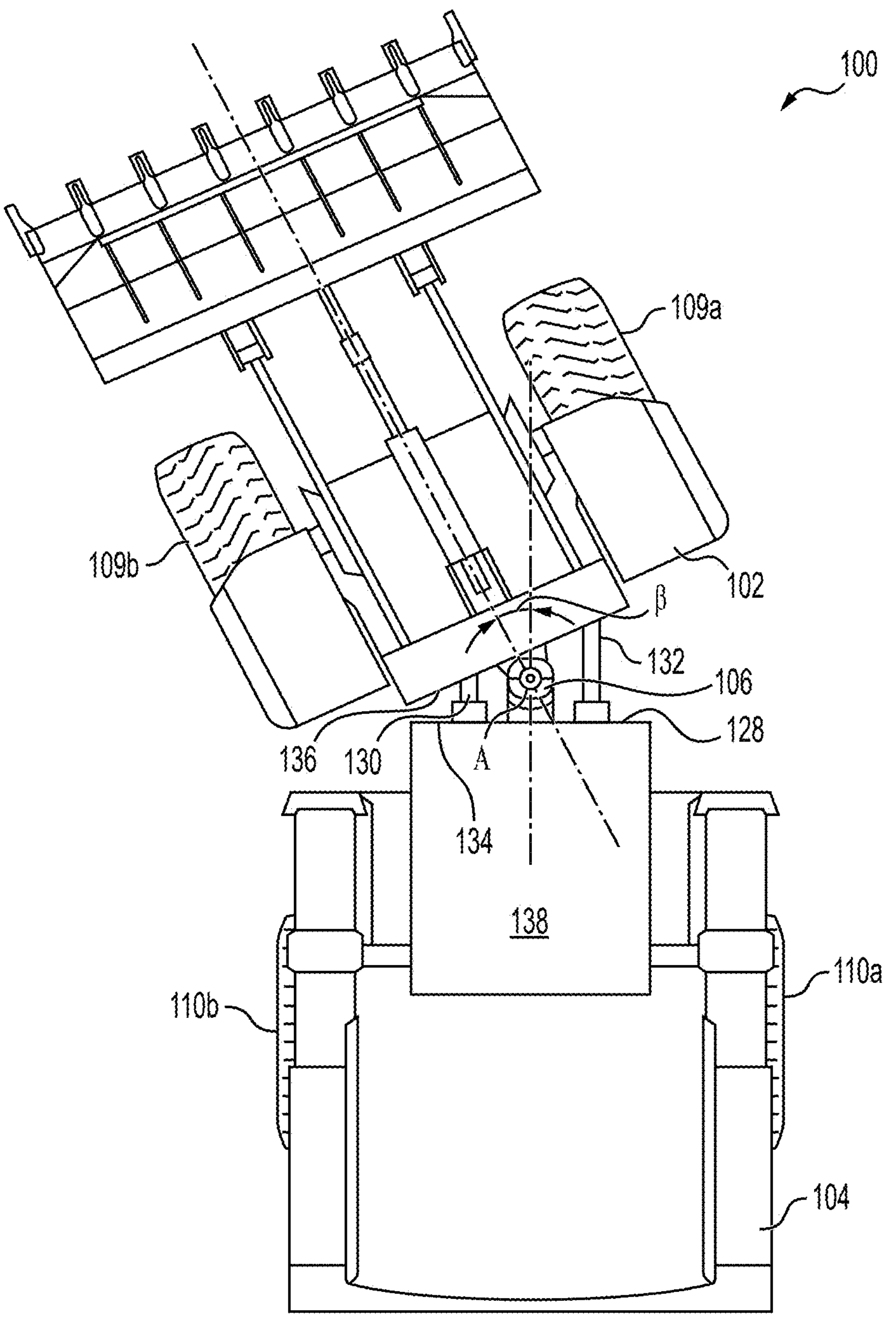
FIG. 2 shows a top view of the articulated vehicle of FIG. 1 with a front frame of the vehicle being articulated with respect to a rear frame of the vehicle at an articulation angle.

The vehicle 100 can also include a steering system 128 to control an articulation of the front frame 102 with respect to the rear frame 104 about the vertical axis A. Referring to FIG. 2, as seen from the top view of the vehicle 100, the steering system 128 can include a first steering cylinder 130 located on a left side of the vehicle 100 and a second steering cylinder 132 located on a right side of the vehicle 100, from the perspective of the operator of the vehicle 100. In particular, the first steering cylinder 130 and the second steering cylinder 132 may be supported between a front portion 134 of the rear frame 104 and a rear portion 136 of the front frame 102. The first and second steering cylinders 130, 132 can be actuated in an opposite manner to control the steering function to move the front frame 102 at an articulation angle β with respect to the rear frame 104. In other words, the first steering cylinder 130 can be extended while the second steering cylinder 132 is being retracted, and vice versa, changing articulation angle β. Such coordinated actuation of the steering cylinders 130, 132 can effect steering of the vehicle 100, subject, of course, to other forces acting on vehicle 100, such as forces acting on one or more wheels of the first and second pairs of wheels 109, 110. For example, the first steering cylinder 130 located on the left side of the vehicle 100 may retract while the second steering cylinder 132 located on the right side of the vehicle 100 simultaneously extends, thereby causing the front frame 102 to pivot counterclockwise about the vertical axis A relative to the rear frame 104 and steering the vehicle 100 towards the left side. However, in one or more embodiments of the disclosed subject matter, a different configuration of the steering system 128 may be utilized to steer the vehicle 100, such as a single steering cylinder located at only one side of the vehicle 100. Further, the steering cylinders 130, 132 may be replaced with other types of actuators, for example, electric motors, hydraulic motors, or the like.

Figure 3:
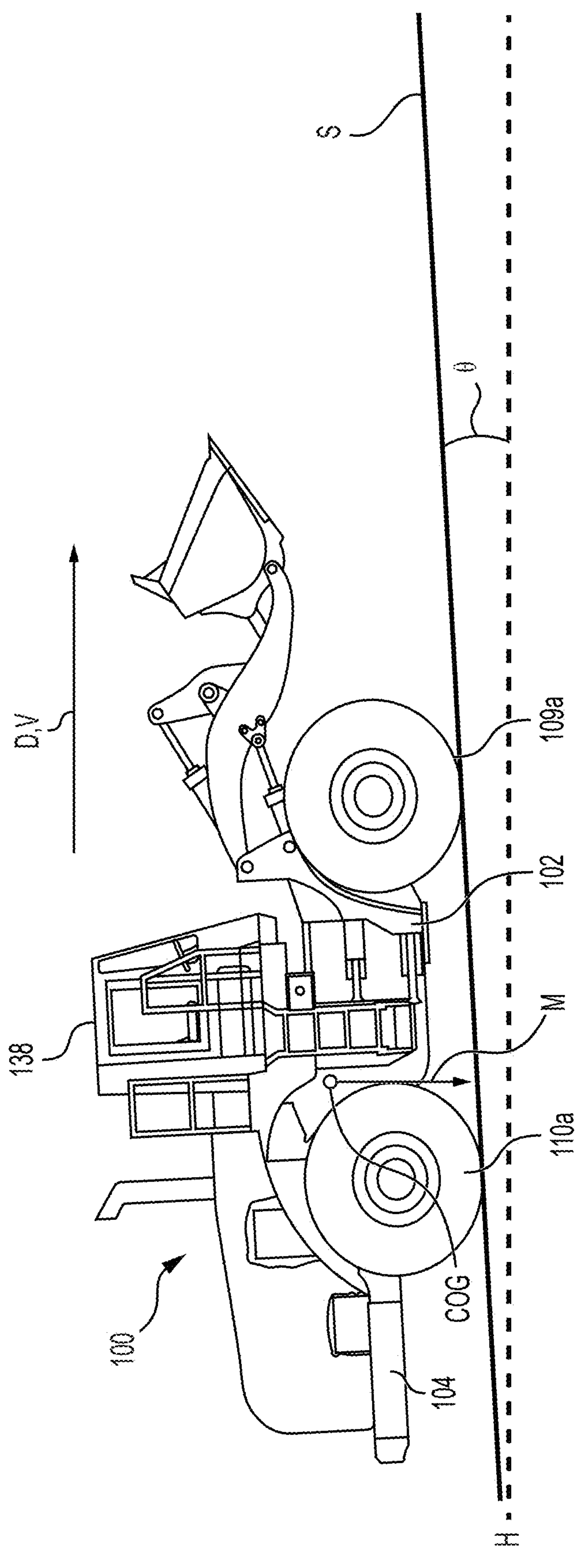
FIG. 3 shows the articulated vehicle of FIG. 1 on a surface having an incline with respect to a horizon, such that the vehicle has a non-zero vehicle angle.

As illustrated in FIGS. 1-3, the vehicle 100 may also include an operator station 138. The operator station 138 may include different interface devices to control the vehicle 100, along with a variety of displays or indicators to convey information to the operator. The interface devices may include, for example, wheels, joysticks, buttons, switches, touchscreens, or other devices used to control movement, such as pivoting, rotating, curling, sliding, swinging, etc., of the first pair of wheels 109 and/or the second pair of wheels 110, and thereby define the overall articulation angle β of the vehicle 100. In particular, the interface devices can include a steering control 140 associated with the steering system 128. In one example, the steering control 140 may be in the form of a steering wheel which may be rotated to control the rotational movement of the front frame 102 with respect to the rear frame 104 about the vertical axis A, as desired, in order to change articulation angle β. In other examples, the steering control 140 may be in the form of joysticks, buttons, touchscreen, etc., without any limitations.

Referring to FIG. 2, the vehicle 100 may be positioned at the articulation angle β, where the front frame 102 is rotated to the left or counter-clockwise relative to the rear frame 104. In an example, a negative value of the articulation angle β may be indicative of counterclockwise pivoting of the front frame 102, from the perspective of an operator facing forward, while a positive value of the articulation angle β may be indicative of clockwise pivoting. It may be understood that in FIG. 1, the vehicle 100 is positioned such that a longitudinal axis of the front frame 102 is aligned with a longitudinal axis of the rear frame 104, and thus, in this case, the articulation angle β is close to zero degrees. As discussed, the steering system 128 can control the rotational movement of the front frame 102 with respect to the rear frame 104 about the vertical axis A. In other words, the steering system 128 may provide a torque at the hitch 106 which causes the rotational movement of the front frame 102 with respect to the rear frame 104 about the vertical axis A.

In particular, the torque, at least in part, may be generated by the coordinated extension and retraction of the first and second steering cylinders 130, 132 of the steering system 128.

The operations of the vehicle 100 may be controlled by a driver/operator thereof, usually present in the operator station 138, although the concepts of the present disclosure may also be practiced in a vehicle 100 that is autonomous or remotely controlled. For instance, the driver may provide a driver control input (hereinafter simply referred to as "control input") to the steering control 140 to command the steering system 128, and thereby provide controlled articulation of the front frame 102 relative to the rear frame 104 about the hitch 106. The driver may achieve this by turning or otherwise moving the steering control 140. It may be understood that the steering control 140 may regulate steering cylinder pressures of the first and second steering cylinders 130, 132 of the steering system 128, and thereby control extension and retraction of the first and second steering cylinders 130, 132, based on the control input. The control input can include values for at least one of the articulation angle β, an articulation angular speed, an articulation angle command, one or more steering cylinder pressure, and one or more linkage cylinder pressure; the terms used herein having their usual meanings.

FIG. 3 illustrates a simplified view of the vehicle 100 proceeding along a surface S that is inclined with respect to the horizon H, such that the vehicle 100 has a non-zero vehicle slope θ. When the vehicle 100 proceeds along such a surface S, the loads on the vehicle 100 can change, affecting the traction of one or more wheels of the first and second pairs of wheels 109, 110, which can in turn affect whether one or more wheels of the first and second pairs of wheels 109, 110 slip with respect to the surface S. FIG. 3 also shows the vehicle speed V of the vehicle 100, as well the vehicle direction D of the vehicle 100, both of which are in the direction of the arrow (i.e., from left to right on the plane of the page). The vehicle direction D can be used because certain vehicles (e.g., loader trucks used in mining applications) are frequently moved in both a forward direction and a rearward direction during operation, a technique referred to as bi-directional tramming, resulting in the vehicle 100 being subject to varying loads. The vehicle speed V and the vehicle direction D can also affect whether one or more wheels of the first and second pairs of wheels 109, 110 slip with respect to the surface S. Additionally, the articulation angle β described above can also affect wheel slip. As further shown in FIG. 3, the vehicle 100 has a vehicle mass M. The vehicle mass M can vary depending on how much the vehicle 100 is loaded, also potentially impacting wheel slip.

As further shown in FIG. 3, the vehicle 100 has a vehicle center of gravity COG. In this context, the vehicle center of gravity COG is used in its typical sense, namely to mean an imaginary point in a body of matter, namely the vehicle 100, where the total weight of the vehicle 100 may be viewed as being concentrated (i.e., the average location of the total weight of the vehicle 100). The vehicle center of gravity COG can be affected by a number of variable associated with the vehicle 100, including the vehicle mass M (e.g., how much the vehicle 100 is loaded), the vehicle slope θ, the articulation angle β, the vehicle speed V, and the vehicle direction D, among others. In other words, the vehicle center of gravity COG can change as a function of one or more of the foregoing variables, and potentially as a function of additional variables. As the vehicle center of gravity COG changes, the tendency of one or more wheels of the first and second pairs of wheels 109, 110 can also change, which can impact the traction of the vehicle 100 on the surface S.

The vehicle center of gravity COG can be determined by, for example, one or more inertial motion units, or IMUs, associated with the vehicle 100. An IMU is a measuring device that may include a number of sensors. The sensors may include accelerometers and/or gyroscopes. The sensors may generate signals indicative of various positional attributes of the object to which it is attached, such as a change in the velocity of object, a change in the attitude/orientation of the object, and a change in the path of travel of the object. The IMU determines the acceleration of the object based on the signals generated by the sensors of the IMU. The IMU can also determine if the vehicle 100 is loaded by monitoring impacts during a zero-speed event.

In some instances, the IMU also determines changes in rotational attributes of the object, such as, pitch, roll, and yaw. In the context of an articulated vehicle, the pitch describes rotation about an axis running from the left of the articulated vehicle to the right of the articulated vehicle, roll describes rotation about an axis running from the front of the articulated vehicle to the rear of the articulated vehicle (i.e., an axis extending between the front frame 102 to the rear frame 104), and yaw describes rotation about an axis that runs vertically through the articulated vehicle, similar to vertical axis A. The pitch, roll, and/or yaw values may be incorporated into the determination of the vehicle slope θ. The IMU may include any other means to assist in determination of the location of the articulated vehicle.

The vehicle center of gravity COG could also be determined, for example, using torque requirements from one or more electric motors 115, the displacement of one or more suspension components of the vehicle 100 (e.g., strut height and/or pressure), and/or a payload system of the vehicle 100 that determines whether the vehicle 100 is loaded, among other alternatives.

FIG. 4 illustrates a simplified view of the various components of the vehicle 100. In some embodiments, the vehicle 100 includes a dynamic brake biasing system 400 (schematically represented in FIG. 4). They dynamic brake biasing system 400 incorporates various parameters associated with the vehicle 100 as it operates on the surface S to more effectively limit the slip of one or more wheels of the first and second pairs of wheels 109, 110, and therefore improve the braking ability of the vehicle 100. Specifically, the dynamic brake biasing system 400 works based on information related to the vehicle center of gravity COG, the vehicle mass M, the vehicle slope θ, the articulation angle β, the vehicle speed V, and the vehicle direction D, among others.

In one embodiment, as illustrated in FIG. 4, the dynamic brake biasing system 400 includes a first sensor system 402 configured to determine the vehicle center of gravity COG of the vehicle 100. For example, the first sensor system 402 may comprise one or more IMUs associated with the front frame 102 and/or the rear frame 104 of the vehicle 100. In this regard, the first sensor system 402 can also be configured to determine the vehicle slope θ.

The dynamic brake biasing system 400 may also include other sensors, such as, capacitive, resistive, potentiometric, piezoelectric, or any other type of electromechanical sensors, associated with various components of the vehicle 100 for sensing a variety of different parameters of the vehicle 100. For instance, the dynamic brake biasing system 400 may include a second sensor system 404 configured to sense real-time articulation angle β of the front frame 102 relative to the rear frame 104. The second sensor system 404 may include one or more rotary position sensors, such as, but not limited to, hitch angle sensor using gyroscopes and/or accelerometers, operatively associated with the hitch 106 to determine the articulation angle β. Alternatively, the second sensor system 404 may include steering cylinder sensors associated with each of the first and second steering cylinders 130, 132 to determine the steering cylinder pressure values which in turn maybe used to determine the real-time articulation angle β of the front frame 102 relative to the rear frame 104.

The dynamic brake biasing system 400 may also include a third sensor system 406 configured to sense real-time rotation of the first and second pair of wheels 109, 110. The third sensor system 406 may include one or more rotation sensors separately associated with each wheel of the first pair of wheels 109 and the second pair of wheels 110 to determine the position and speed of the wheels. In this manner, the third sensor system 406 may be configured to determine a wheel speed W of one or more wheels of the first and second pairs of wheels 109, 110 in order to provide a measured wheel speed $W_M$, as well as potentially the vehicle speed V and the vehicle direction D. As such, the third sensor system 406 may also include one or more components of a global navigation satellite system, or GNSS. A GNSS is a satellite navigation system with global coverage that can be used to provide autonomous geo-positioning of objects associated with the GNSS, such as an autonomously operated articulated vehicle. One example of a GNSS is a global positioning system, or GPS. The GNSS may include a satellite positioning unit disposed on the articulated vehicle. The satellite positioning unit can generate signals indicative of the location of the articulated vehicle (e.g., on the surface S), the vehicle speed V, and the vehicle direction D. The satellite positioning unit may determine and generate signals corresponding to the latitude and/or longitude of the articulated vehicle. The satellite positioning unit may be disposed on a top portion of the articulated vehicle to communicate with a number of satellites of the GNSS and to receive signals indicative of the location of the articulated vehicle, the vehicle speed V. and the vehicle direction D. In the context of IMUs specifically, such as the one or more IMUs of the first sensor system 402, the GNSS and its satellite positioning unit can be used to correct any bias in the output provided by the one or more IMUs in order to obtain more accurate readings and therefore enable more precise control of the articulated vehicle. Either as an alternative, or in addition to, the GNSS, the third sensor system 406 could also be configured to sense real-time rotation of the first and second pair of wheels 109, 110 by comparing a deceleration rate provided by the one or more IMUs on the vehicle 100 with wheel speed deceleration rates provided by the one or more rotation sensors separately associated with each wheel of the first pair of wheels 109 and the second pair of wheels 110.

The dynamic brake biasing system 400 may include a fourth sensor system 408 configured to sense the vehicle mass M. In this manner, the dynamic brake biasing system 400 can determine the loading of the vehicle 100, which can change. Although the fourth sensor system 408 is shown as being disposed on the vehicle 100, it is possible that the fourth sensor system 408 is disposed off of vehicle 100. For example, the fourth sensor system 408 may be a scale apparatus on to which the vehicle 100 can be placed and weighed in order to determine the vehicle mass M. The vehicle mass M can then be input into the dynamic brake biasing system 400.

In some embodiments, the dynamic brake biasing system 400 may include real time processing circuitry 410, hereinafter simply referred to as controller 410. The controller 410 may be disposed in signal communication with each of the first sensor system 402, the second sensor system 404, the third sensor system 406, and the fourth sensor system 408, as well as any other associated sensor systems. The controller 410 may be a logic unit using one or more integrated circuits, microchips, microcontrollers, microprocessors, all or part of a Central Processing Unit (CPU), Graphics Processing Unit (GPU), Digital Signal Processor (DSP), Field Programmable Gate Array (FPGA), or other circuits suitable for executing instructions or performing logic operations. Other peripheral circuitry, such as buffers, latches, switches, and so on, may be implemented within the controller 410 or separately, as desired. Various other circuits may also be associated with the controller 410, such as power supply circuitry, signal conditioning circuitry, solenoid driver circuitry, and other types of circuitry. Further, the dynamic brake biasing system 400 can include a memory 412 in communication with the controller 410 and configured to store program instructions and sensor signals. The memory 412 may include a non-transitory computer readable medium, such as RAM, ROM, a flash memory, a hard drive, etc. The memory 412 may be configured to store electronic data associated with operations of the vehicle 100.

Figure 5:
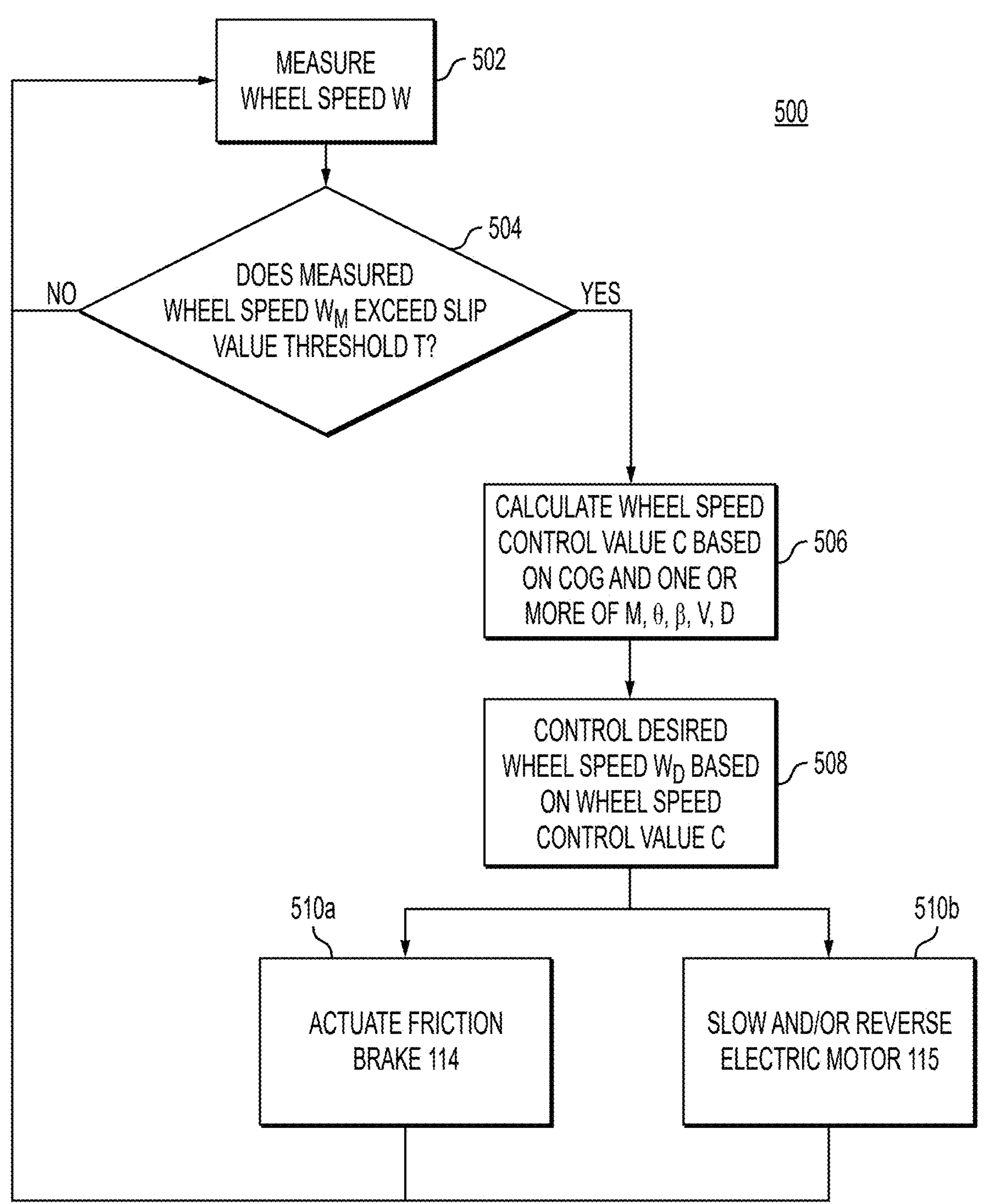
FIG. 5 shows a flow chart illustrating a method of dynamic brake biasing according to the present disclosure.

FIG. 5 shows a method 500 for dynamically controlling the vehicle 100, the vehicle 100 having at least one wheel (e.g., wheel 109*a*, 109*b*, 110*a*, 110*b*, etc.). The method 500 can be carried out by the dynamic brake biasing system 400 of the vehicle 100, for example.

In step 502, the method 500 includes measuring a wheel speed W of the at least one wheel as a measured wheel speed $W_M$. The wheel speed W can be determined using the third sensor system 406, as discussed above, for example.

In step 504, the method 500 determines whether the measured wheel speed $W_M$ exceeds a slip value threshold T. The slip value threshold T can have a constant or variable value. The slip value threshold T can also be input into the dynamic brake biasing system 400 of the vehicle 100 (e.g., by an operator of the vehicle 100), or determined from stored values (e.g., a lookup table in memory 412) based on given terrain conditions (e.g., gravel, moist dirt, dry dirt, sand, etc.). The operator of the vehicle 100 could also input existing terrain conditions into the dynamic brake biasing system 400 in order to determine the slip value threshold T. In an embodiment, the slip value threshold T can be based on the vehicle speed V.

In step 504, if the measured wheel speed $W_M$ does not exceed the slip value threshold T, the method 500 returns to step 502, where the controller 410 of the dynamic brake biasing system 400, for example, continually monitors the wheel speed W of the at least one wheel. If the measured wheel speed $W_M$ does exceed the slip value threshold T, however, the method 500 proceeds to step 506.

In step 506, the method calculates a wheel speed control value C based on the vehicle center of gravity COG and at least one of the vehicle mass M, the vehicle slope θ, the articulation angle β, the vehicle speed V, and the vehicle direction D. As discussed above, the vehicle center of gravity COG and the vehicle slope θ can be determined using the first sensor system 402, including one or more IMUs thereof. The articulation angle β can be determined using second sensor system 404. The measured wheel speed $W_M$, the vehicle speed V. and the vehicle direction D can all be determined using, for example, the third sensor system 406. The vehicle mass M, meanwhile, can be determined using the fourth sensor system 408. The first sensor system 402, second sensor system 404, third sensor system 406, and fourth sensor system 408 can all be in signal communication with the controller 410, and can all form part of the dynamic brake biasing system 400.

The method 500 then proceeds to step 508, in which the method 500 controls a desired wheel speed $W_D$ of the at least one wheel based on the wheel speed control value C. In practice, this means the controller 410 of the dynamic brake biasing system 400 controls a friction brake 114 associated with the at least one wheel based on the wheel speed control value C, as in step 510*a*, and/or controls an electric motor 115 associated with the at least one wheel based on the wheel speed control value C, as in step 510*b*. In this manner, the wheel speed control value C can be a brake pressure for the friction brake 114, and/or a torque for the electric motor 115. If the at least one wheel is both stoppable by a friction brake 114 and drivable by an electric motor 115, the wheel speed control value C can comprise values used to control both the friction brake 114 and the electric motor 115.

In an embodiment, controlling the desired wheel speed $W_D$ of the at least one wheel based on the wheel speed control value C comprises slowing a rotation of the at least one wheel until the measured wheel speed $W_M$ of the at least one wheel falls below the slip value threshold T. When the at least one wheel is stoppable by a friction brake 114, slowing the rotation of the at least one wheel until the measured wheel speed $W_M$ of the at least one wheel falls below the slip value threshold T comprises actuating the friction brake 114. When the at least one wheel is drivable by an electric motor 115, slowing the rotation of the at least one wheel until the measured wheel speed $W_M$ of the at least one wheel falls below the slip value threshold T comprises at least one of slowing and reversing a rotation of the electric motor 115.

In an embodiment, the wheel speed control value C could be adjusted (e.g., scaled) based on the articulation angle β and/or which wheel of the vehicle 100 is being controlled by the dynamic brake biasing system 400. For example, at higher values of the articulation angle β, outer wheels of the vehicle 100 (e.g., wheels 109*b*, 110*b*) can rotate more quickly than inner wheels of the vehicle 100 (e.g., wheels 109*a*, 110*a*). As such, when the articulation angle β is higher and the at least one wheel being controlled is an outer wheel of the vehicle 100 (e.g., at least one of wheels 109*b*, 110*b*), it may be desirable to scale the corresponding wheel speed control value C for that wheel to a relatively higher value to compensate, resulting in a more accurate desired wheel speed $W_D$ of the at least one wheel. The scaling of the wheel speed control value C in such situations can also be a function of the vehicle speed V.

In an embodiment, after the measured wheel speed $W_M$ of the at least one wheel falls below the slip value threshold T, the method 500 can further comprise determining whether the measured wheel speed $W_M$ of the at least one wheel again exceeds the slip value threshold T. For example, the dynamic brake biasing system 400 and its controller 410 can continue to monitor the wheel speed W of the at least one wheel (e.g., using third sensor system 406) to determine if the at least one wheel slips again (i.e., the measured wheel speed $W_M$ of the at least one wheel again exceeds the slip value threshold T). This embodiment is shown in FIG. 6, as after steps 510*a*, 510*b*, the method 500 returns to step 502.

Other variations of the preceding steps are also possible and within the scope of the present application. For example, various steps could be omitted and/or reordered without departing from the scope of the present application.

Figure 6:
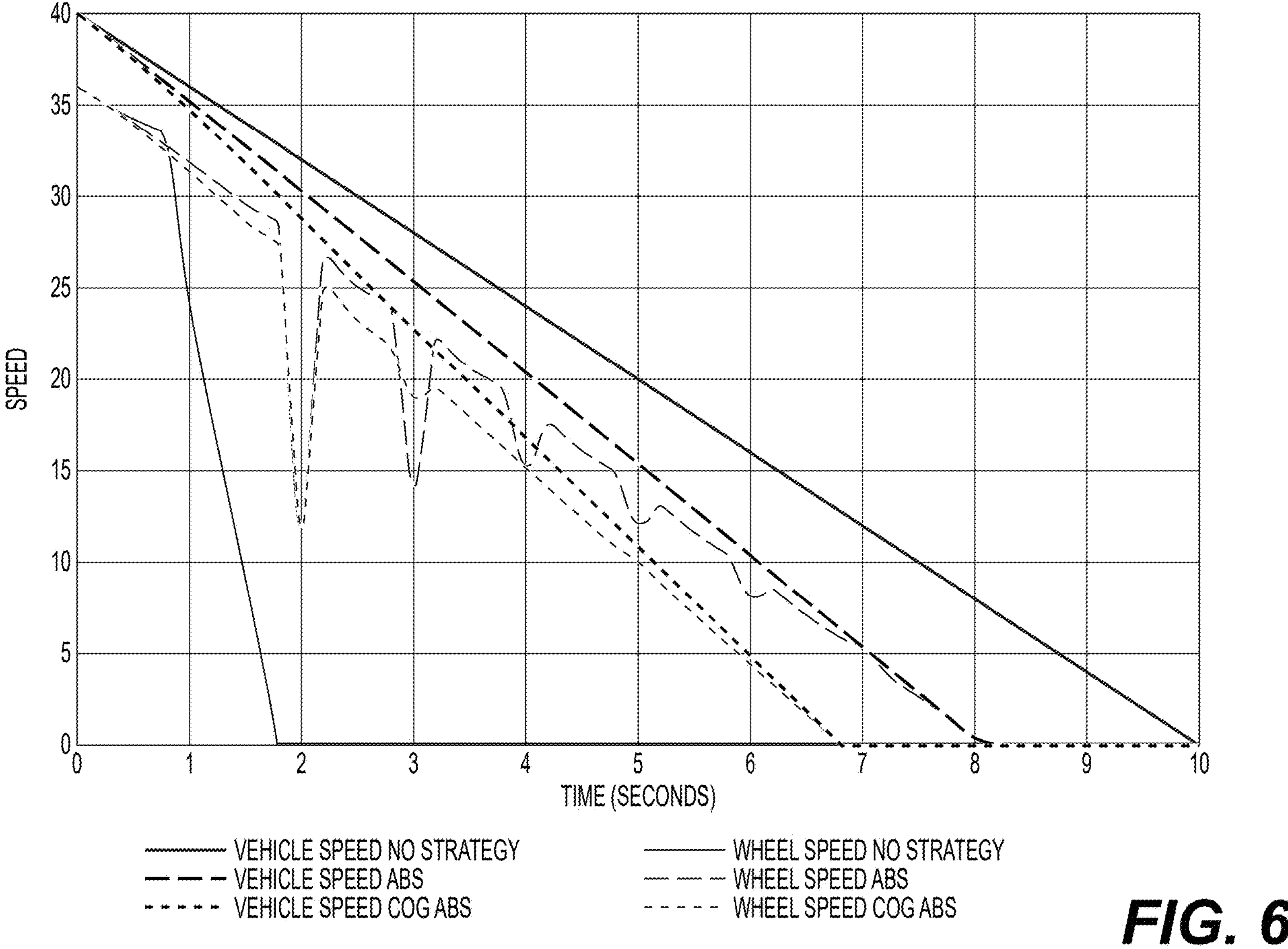
FIG. 6 shows vehicle and wheel speed over time across different control methodologies, including dynamic brake biasing according to the present disclosure.

FIG. 6 shows the improvement in stopping performance of a vehicle 100 equipped with the dynamic brake biasing system 400 discussed herein as compared to conventional stopping techniques, including attempting to stop the vehicle without any sort of conventional anti-lock braking system ("ABS"), and attempting to stop the vehicle using a conventional ABS.

In FIG. 6, the solid lines show both vehicle speed and wheel speed over time for a vehicle without any sort of conventional ABS. As shown, the wheel speed becomes zero after a relatively short time (e.g., less than two seconds), as the friction brake of the vehicle locks the wheel, resulting in the wheel sliding across the surface on which it is disposed. As such, the vehicle speed, as can be seen, becomes zero after a relatively long time (e.g., ten seconds).

To avoid locking the wheel of the vehicle during braking, a conventional ABS instead quickly alternates between braking the wheel and not braking the wheel. As such, FIG. 6 shows using longer dashed lines that the wheel speed quickly drops, rises again, and drops again, successively, in a highly iterative process. As a result, the vehicle speed becomes zero more quickly than it does than if no ABS is used (i.e., in about eight seconds).

Using the dynamic brake biasing system 400 discussed herein, however, results in the ability to more effectively control the braking of a wheel (e.g., through a friction brake 114 and/or an electric motor 115) by basing the wheel speed control value C, which may be a brake pressure for the friction brake 114 or a torque for the electric motor 115, on the vehicle center of gravity COG and at least one additional variable from among the vehicle mass M, the vehicle slope θ, the articulation angle β, the vehicle speed V, and the vehicle direction D. By taking these values into consideration, the dynamic brake biasing system 400 arrives at an optimum wheel speed control value C more quickly (i.e., with fewer iterations) as compared to a conventional ABS. As such, the wheel speed of the vehicle 100 equipped with the dynamic brake biasing system 400 of the present disclosure becomes zero faster (e.g., in less than seven seconds), such that the vehicle speed of the vehicle 100 equipped with the dynamic brake biasing system 400 also becomes zero faster (e.g., in less than seven seconds) as compared to conventional techniques. In particular, the dynamic brake biasing system 400 of the present disclosure requires fewer iterations as compared to a conventional ABS, which results in more quickly bringing both the wheel speed and vehicle speed down to zero.

INDUSTRIAL APPLICABILITY

In general, the methods, systems, and controllers of the present application provide dynamic brake biasing for articulated vehicles that results in improved machine stability when the articulated vehicle is unloaded, or the terrain on which the vehicle operates results in wheel slippage. The methods, systems, and controllers of the present application also improve functional safety due to the potential existence of two distinct control systems (e.g., a hydromechanical braking system and an electric motor system), as well as simplified braking architecture.

What is claimed is:

1. A method comprising:

measuring a wheel speed of at least one wheel of an articulating vehicle having a front frame and a rear frame connected by an articulation joint, the vehicle having front and rear axles and the at least one wheel mounted on one of the front and rear axles;

determining whether the measured wheel speed exceeds a slip value threshold; and if the measured wheel speed exceeds the slip value threshold, calculating a wheel speed control value based on a center of gravity of the vehicle, a location of the at least one wheel relative to an axis of the vehicle, and at least one of:

a vehicle mass of the vehicle, a vehicle slope of the vehicle, an articulation angle of the vehicle, a vehicle speed of the vehicle, and a vehicle direction of the vehicle; and controlling a desired wheel speed of the at least one wheel based on the wheel speed control value.

2. The method of claim 1, wherein controlling the desired wheel speed of the at least one wheel based on the wheel speed control value comprises slowing a rotation of the at least one wheel until the measured wheel speed falls below the slip value threshold.

3. The method of claim 1, wherein the slip value threshold is based on the vehicle speed.

4. The method of claim 1, wherein the wheel speed control value comprises a brake pressure for a friction brake.

5. The method of claim 1, wherein the wheel speed control value comprises a torque for an electric motor.

6. The method of claim 1, wherein the center of gravity is determined using at least one inertial motion unit.

7. The method of claim 1, further comprising, if the measured wheel speed exceeds the slip value threshold, calculating the wheel speed control value based on a lateral location of the at least one wheel relative to a longitudinal axis of the vehicle.

8. The method of claim 2, wherein, after the measured wheel speed falls below the slip value threshold, the method further comprises:

determining whether the measured wheel speed exceeds the slip value threshold.

9. The method of claim 2, further comprises actuating a friction brake of the vehicle to slow down the rotation of the at least one wheel.

10. The method of claim 9, further comprising actuating the friction brake to stop the rotation of the at least one wheel.

11. The method of claim 9, further comprising driving, by an electric motor, the at least one wheel.

12. The method of claim 9, wherein slowing the rotation of the at least one wheel until the measured wheel speed falls below the slip value threshold comprises at least one of slowing and reversing a rotation of an electric motor.

13. The method of claim 12, wherein slowing the rotation of the at least one wheel until the measured wheel speed falls below the slip value threshold comprises at least one of: actuating the friction brake, and at least one of slowing and reversing a rotation of the electric motor.

14. A dynamic brake biasing system comprising:

at least one wheel of an articulating vehicle having a front frame, a rear frame connected by an articulation joint, front and rear axles, the at least one wheel mounted on one of the front and rear axles and configured to be stopped by a friction brake or driven by an electric motor, the articulating vehicle having a center of gravity, a vehicle mass, a vehicle slope, an articulation angle, a vehicle speed, and a vehicle direction; and a controller configured to:

measure a wheel speed of the at least one wheel as a measured wheel speed, determine whether the measured wheel speed exceeds a slip value threshold, and if the measured wheel speed exceeds the slip value threshold, calculate a wheel speed control value based on the center of gravity, a location of the at least one wheel relative to an axis of the vehicle, and at least one of: the vehicle mass, the vehicle slope, the articulation angle, the vehicle speed, and the vehicle direction, and control a desired wheel speed of the at least one wheel based on the wheel speed control value.

15. The system of claim 14, wherein control the desired wheel speed of the at least one wheel based on the wheel speed control value comprises slowing a rotation of the at least one wheel until the measured wheel speed falls below the slip value threshold.

16. The system of claim 14, wherein the at least one wheel is configured to be stopped by the friction brake, and wherein slowing a rotation of the at least one wheel until the measured wheel speed falls below the slip value threshold comprises actuating the friction brake.

17. The system of claim 14, wherein the at least one wheel is configured to be driven by the electric motor, and wherein slowing a rotation of the at least one wheel until the measured wheel speed falls below the slip value threshold comprises at least one of slowing and reversing a rotation of the electric motor.

18. A controller configured to:

receive a measured wheel speed of at least one wheel of an articulating vehicle having a front frame, a rear frame connected by an articulation joint, front and rear axles, the at least one wheel mounted on one of the front and rear axles and configured to be stopped by a friction brake or driven by an electric motor;

receive a vehicle mass of the vehicle, a vehicle slope of the vehicle, an articulation angle of the vehicle, a vehicle speed of the vehicle, and a vehicle direction of the vehicle;

determine whether the measured wheel speed exceeds a slip value threshold; and if the measured wheel speed exceeds the slip value threshold, calculate a wheel speed control value based on a center of gravity of the vehicle, a location of the at least one wheel relative to an axis of the vehicle, and at least one of the vehicle mass, the vehicle slope, the articulation angle, the vehicle speed, and the vehicle direction; and control a desired wheel speed of the at least one wheel based on the wheel speed control value.

19. The controller of claim 18, wherein control the desired wheel speed of the at least one wheel based on the wheel speed control value comprises slowing the at least one wheel using a friction brake and/or an electric motor until the measured wheel speed falls below the slip value threshold.

20. The controller of claim 18, wherein the controller is configured to receive the center of gravity from at least one inertial motion unit.

* * * * *